(12) United States Patent
Spencer et al.

(10) Patent No.: US 8,459,695 B2
(45) Date of Patent: Jun. 11, 2013

(54) CURTAIN AIRBAG ASSEMBLY

(75) Inventors: Alexander Charles Spencer, Brentwood (GB); Marcus John Scott Ward, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 12/881,660

(22) Filed: Sep. 14, 2010

(65) Prior Publication Data

US 2011/0062694 A1    Mar. 17, 2011

(30) Foreign Application Priority Data

Sep. 14, 2009    (GB) .................................. 0915987.2

(51) Int. Cl.
| | | |
|---|---|---|
| *B60R 21/213* | (2011.01) | |
| *B60R 21/232* | (2011.01) | |
| *B60R 21/233* | (2006.01) | |
| *B60R 21/2338* | (2011.01) | |
| *A44B 11/25* | (2006.01) | |
| *A44B 17/00* | (2006.01) | |

(52) U.S. Cl.
USPC .... 280/743.2; 280/730.2; 403/27; 24/573.09; 24/614; 24/DIG. 52

(58) Field of Classification Search
USPC .............. 280/743.2, 730.2; 403/27, 292–294, 403/300, 301, 305, 321; 24/573.09, 614, 24/615, DIG. 52
See application file for complete search history.

(56) References Cited

U.S. PATENT DOCUMENTS

| | | | | | |
|---|---|---|---|---|---|
| 2,263,954 | A | * | 11/1941 | Pollard | 403/182 |
| 2,465,783 | A | * | 3/1949 | Beaty | 403/180 |
| 3,716,031 | A | * | 2/1973 | Rowbury | 119/805 |
| 4,150,464 | A | * | 4/1979 | Tracy | 24/313 |
| 4,226,035 | A | * | 10/1980 | Saito | 37/314 |
| 4,825,515 | A | * | 5/1989 | Wolterstorff, Jr. | 24/625 |
| 4,991,272 | A | * | 2/1991 | Bianchi | 24/616 |
| 5,438,737 | A | * | 8/1995 | Anscher et al. | 24/630 |

(Continued)

FOREIGN PATENT DOCUMENTS

| | | |
|---|---|---|
| DE | 10392877 T5 | 9/2005 |
| GB | 2374053 A | 10/2002 |
| WO | 03059700 A1 | 7/2003 |

OTHER PUBLICATIONS

European Patent Office, Search Report for corresponding GB 0915987.2 mailed Dec. 8, 2009.

*Primary Examiner* — Paul N Dickson
*Assistant Examiner* — Joselynn Y Sliteris
(74) *Attorney, Agent, or Firm* — Frank A. MacKenzie; Brooks Kushman P.C.

(57) ABSTRACT

A curtain airbag assembly is provided having a number of airbags 7a, 7b, 7c and 7d arranged in a side by side relationship. Lower ends of the airbags 7a, 7b, 7c and 7d are linked to the adjacent airbag by an airbag tether connector assembly 10. Each of the tether connector assemblies includes first and second connectors 20, 30 that engage with one another and snap together to fasten together two tethers 26, 36. In the event that the first and second connectors 20, 30 are not correctly coupled together an indication of this fact is providing in one of a number of manners thereby reducing the risk that a vehicle 5 fitted with such a curtain airbag assembly can enter service with one or more tethers 26, 36 not connected.

20 Claims, 9 Drawing Sheets

U.S. PATENT DOCUMENTS

| | | | |
|---|---|---|---|
| 6,010,273 A * | 1/2000 | Metzler, Jr. | 403/314 |
| 6,237,826 B1 * | 5/2001 | Gould | 224/660 |
| 6,390,345 B1 | 5/2002 | Brown et al. | |
| 6,460,232 B2 * | 10/2002 | Maruoka | 24/615 |
| 6,507,982 B2 * | 1/2003 | Kawamura | 24/615 |
| 6,615,460 B1 * | 9/2003 | Baumgarten | 24/615 |
| 6,634,671 B2 * | 10/2003 | Heigl et al. | 280/743.2 |
| 6,652,191 B2 * | 11/2003 | Moga | 405/186 |
| 6,665,915 B1 * | 12/2003 | Higuchi | 24/615 |
| 6,991,255 B2 | 1/2006 | Henderson et al. | |
| 7,125,039 B2 * | 10/2006 | Bossecker et al. | 280/730.2 |
| 7,861,457 B2 * | 1/2011 | Blette et al. | 43/44.9 |
| 7,942,438 B2 * | 5/2011 | Smith et al. | 280/728.1 |
| 8,109,048 B2 * | 2/2012 | West et al. | 52/173.3 |
| 8,191,329 B2 * | 6/2012 | Thiagarajan et al. | 52/590.1 |
| 2002/0024204 A1 | 2/2002 | Fischer | |
| 2003/0041423 A1 * | 3/2003 | Lai | 24/615 |
| 2003/0205888 A1 | 11/2003 | Keshavaraj | |
| 2003/0234523 A1 | 12/2003 | Henderson et al. | |
| 2004/0218969 A1 * | 11/2004 | Harley | 403/300 |
| 2005/0055810 A1 * | 3/2005 | Loughlin et al. | 24/615 |

* cited by examiner

CURTAIN AIRBAG ASSEMBLY

CROSS-REFERENCE TO RELATED APPLICATIONS

This application is claims foreign priority benefits under 35 U.S.C. §119(a)-(d) to GB 0915987.2, filed Sep. 14, 2009, which is hereby incorporated by reference in its entirety.

TECHNICAL FIELD

This invention relates to curtain airbags for vehicles and in particular to an improved apparatus for connecting two or more airbags together.

BACKGROUND

It is well known to provide a curtain airbag assembly that when deployed overlies one or more side windows of a vehicle. Before deployment the airbag is stowed behind a headliner or trim panel so as not to be visible to an occupant of the vehicle. If the vehicle has a number of side windows it may not be practical to use a single airbag to cover all of these due to the size of inflator required and/or the time delay in inflating a very large airbag. It is therefore known from, for example, U.S. Pat. No. 6,991,255 to provide a number of separate airbags that are joined together at their lower ends by tethers so as to effectively form when inflated a single airbag covering all of the side windows.

Such an airbag assembly can be reliant on the tethers used to connect adjacent airbags together keeping the airbags in close proximity in order for the airbags to operate as a single airbag. If the connection between airbag tethers is not correctly made or the tethers are not connected this could have a detrimental affect on deployment due to the fact that the airbags can separate as they deploy downwards.

A further problem of the incomplete connection of the tethers is that the airbag assembly could lose a proportion of its occupant retention properties due to the lack of tension in the airbag along the length of the vehicle.

SUMMARY

An airbag tether connector assembly is disclosed that provides an indication if the coupling between two tethers is not correctly made.

According to a first disclosed embodiment, an airbag tether connector assembly for a vehicle comprises a first connector to which a first tether is attached and a second connector to which a second tether is attached, the first and second connectors comprising a retaining mechanism holding the two connectors coupled together and providing a visible indication that the first and second connectors are not correctly coupled together; and a mounting means releasably attaching the first and second connectors to the vehicle when the first and second connectors are in engagement with one another.

The retaining means may be a snap-lock connection.

The indication may be the inability of the connector to correctly mate with the mounting means.

The indication may be the inability of the mounting means to be secured to the vehicle.

The indication may be feedback from an assembly tool that the mounting means has not been correctly secured to the vehicle.

The indication may be an electrical continuity signal from the connector.

The first connector may include an electrical contact, the second member may include an electrical contact and an electric circuit may be completed through the electrical contacts of the first and second connectors so as to provide an indication of circuit continuity only when the first connector is correctly coupled to the second connector.

The indication may be a visual indication produced by using contrasting colors for the first and second connectors.

There may be more than one pair of first and second connectors releasably connected to the vehicle by a single mounting means.

There may be a number of first and second connector pairs nested together and an electrical circuit is only completed when all of the pairs of connectors are correctly coupled and correctly nested.

According to a second disclosed embodiment, a curtain airbag assembly for a vehicle comprises at least a first and a second inflatable airbag arranged in a side by side relationship with one another, each airbag being secured to a structural part of the vehicle at an upper end thereof, first and second tethers attached to the first and second airbags respectively, a first connector attached to the first tether, and a second connector attached to the second tether. The first and second connectors comprise a retaining mechanism holding the two connectors coupled together and providing a visible indication that the first and second connectors are not correctly coupled together. The curtain airbag assembly further comprises a mounting means releasably attaching the first and second connectors to the vehicle when the first and second connectors are in engagement with one another.

According to a third disclosed embodiment, a method for assembling a curtain airbag assembly having a number of airbags into a vehicle comprises attaching each of the airbags at an upper end to a structural part of the vehicle, connecting together tethers used to link adjacent airbags using respective connector means, providing an indication if the respective tether means are not correctly coupled together and releasably securing the airbags and their tethers in stowed position within the vehicle.

BRIEF DESCRIPTION OF THE DRAWINGS

The invention will now be described by way of example with reference to the accompanying drawing of which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
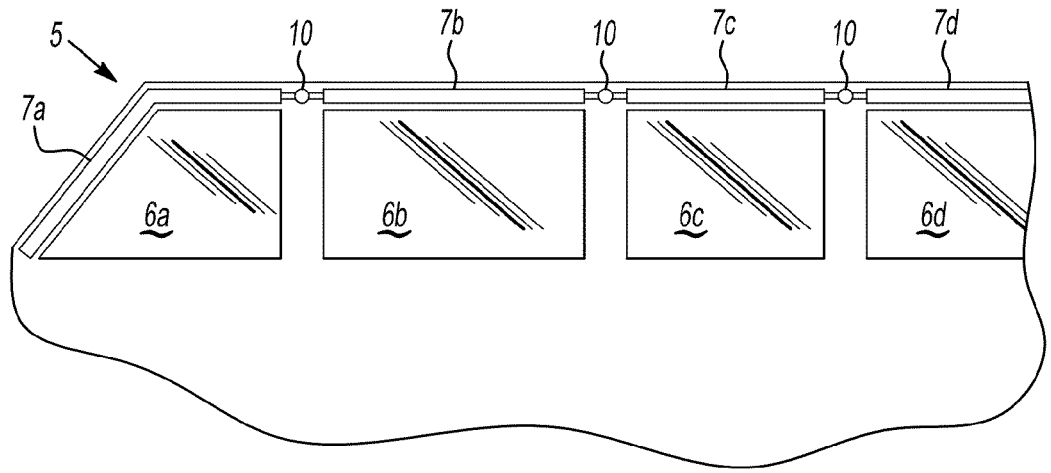
FIG. 1 is an interior side view of part of a motor vehicle having a curtain airbag assembly having a number of airbags according to one aspect of the invention showing the airbags in a stowed or pre-deployed state.
Figure 2:
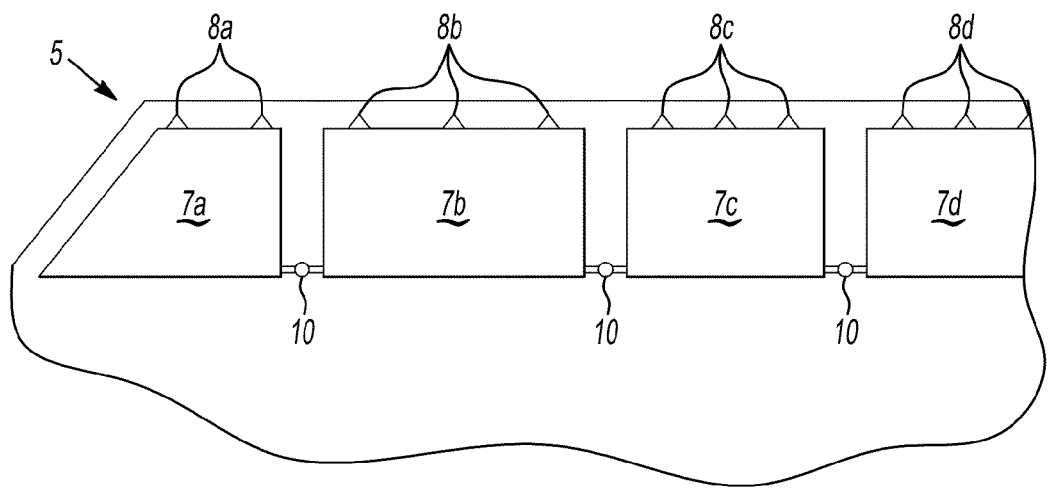
FIG. 2 is a view similar to FIG. 1 but showing the airbags in a deployed state.

With reference to FIGS. 1 and 2 there is shown a motor vehicle 5 having a curtain airbag assembly comprised of four separate airbags 7a, 7b, 7c and 7d each of which is positioned so that when deployed it will overlie a corresponding window 6a, 6b, 6c and 6d. Separate inflators (not shown) may be used for each airbag 7a, 7b, 7c and 7d or two or more airbags 7a, 7b, 7c and 7d may share a common inflator.

The airbags 7a, 7b, 7c and 7d are arranged in a side by side relationship and are secured at an upper end to a structural part of the vehicle 5 by a number of securing means 8a, 8b, 8c and 8d. Each of the airbags 7a, 7b, 7c and 7d is attached at a lower end to an adjacent airbag 7a, 7b, 7c and 7d by means of an airbag tether connector assembly 10 having connectors used to hold the airbags 7a, 7b, 7c and 7d together when they are deployed. As can be seen in FIG. 1 the airbag tether connector assemblies 10 lie adjacent a structural part of the vehicle 5 when the airbags 7a, 7b, 7c and 7d are stowed and also include a mounting means (not visible on FIGS. 1 and 2) to hold the airbags 7a, 7b, 7c and 7d in their folded or stowed state in a manner that they are readily released when the airbags 7a, 7b, 7c and 7d are deployed.

The airbags 7a, 7b, 7c and 7d overlie the windows 6a, 6b, 6c and 6d when they are in their deployed state and, preferably, the lower end of each airbag 7a, 7b, 7c and 7d is lower than the lower edge of the corresponding window 6a, 6b, 6c and 6d. Note that the gaps between the airbags 7a, 7b, 7c and 7d are exaggerated in FIGS. 1 and 2 and in practice the gaps are kept to a minimum.

During use of the vehicle 5 the airbags 7a, 7b, 7c and 7d will normally be in their stowed state as shown in FIG. 1. When required to provide protection to an occupant of the vehicle 5 located adjacent a window 6a, 6b, 6c and 6d the inflators are energized and the airbags 7a, 7b, 7c and 7d inflated to their deployed state as shown in FIG. 2 so as to overlie the windows 6a, 6b, 6c and 6d.

Upon deployment of the airbags 7a, 7b, 7c and 7d the connectors of the airbag tether connector assemblies 10 detach from their mounting means so as to permit the airbags 7a, 7b, 7c and 7d to deploy.

Figure 3A:
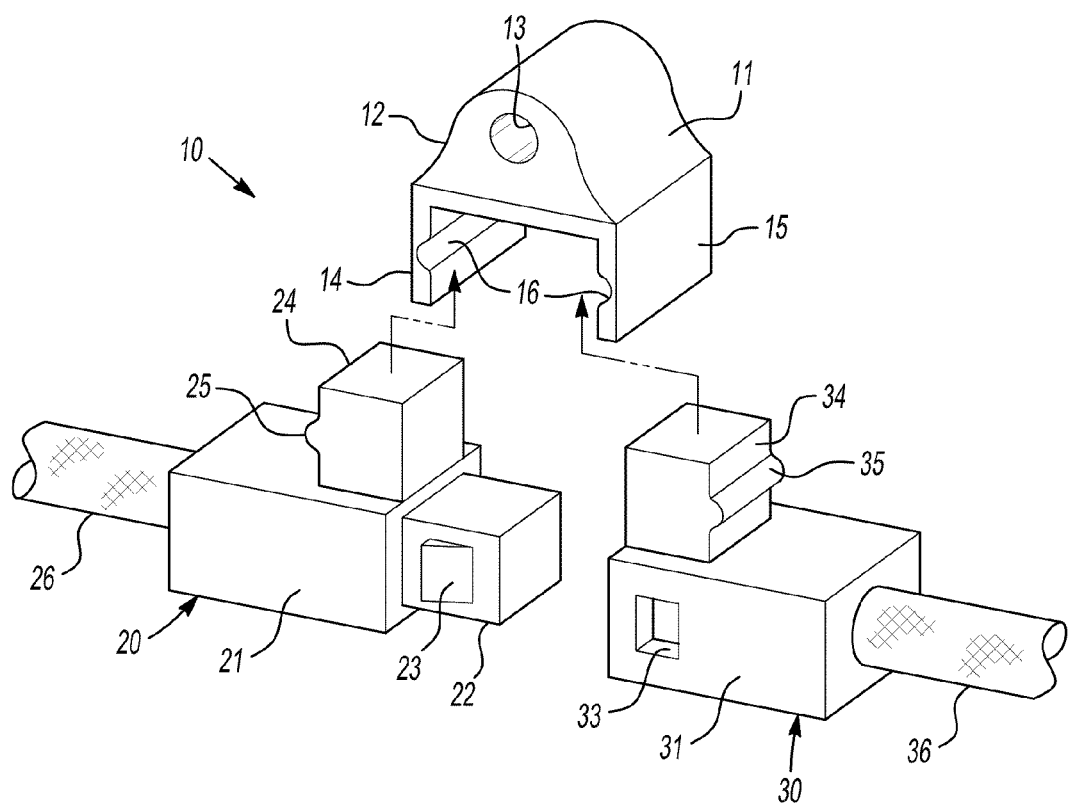
FIG. 3A is an exploded pictorial representation of a first embodiment of an airbag tether connector assembly according to another aspect of the invention showing the assembly in a pre-assembled state.
Figure 3B:
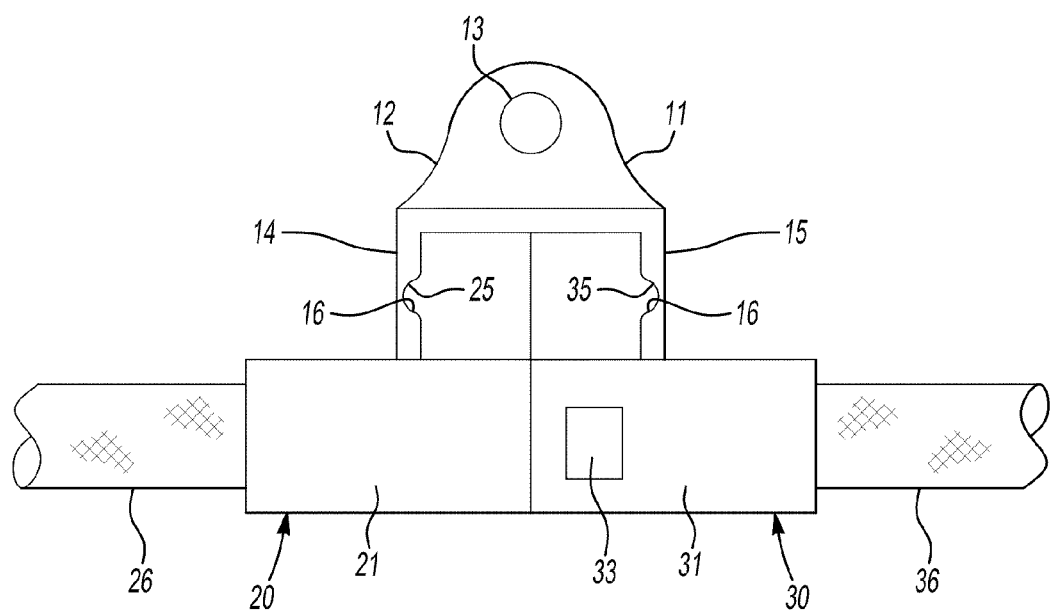
FIG. 3B is a side view of the assembly of FIG. 3A in a fully assembled state.

With reference to FIGS. 3A and 3B there is shown a first embodiment of an airbag tether connector assembly. The airbag tether connector assembly 10 includes a mounting means in the form of a U-shaped bracket 11 and a connector comprising of first and second connectors 20 and 30.

The U-shaped bracket 11 has a body portion 12 from which depends two legs 14, 15. The body portion 12 has an aperture 13 therein through which a bolt (not shown) can be passed to secure the U-shaped bracket 11 to a structural part of a vehicle 5 such as for example a cant rail.

Each of the depending legs 14, 15 includes a recess 16 for cooperation with a corresponding projection 25, 35 formed on the first and second connectors 20 and 30 so as to releasably attach the first and second connectors 20 and 30 to the U-shaped bracket 11.

The first connector 20 has a body portion 21 to which is attached a free end of a first tether 26, a first nose portion 22 forming a connector and a second nose portion 24 on which is formed the projection 25.

A detent or projection 23 (of which only one is visible) is formed on opposite sides of the first nose portion 22. The projections 23 form part of a retaining mechanism used to hold the first and second tether connectors 20 and 30 together.

The second connector 30 has a body portion 31 to which is attached a free end of a second tether 36 and a nose portion 34 on which is formed the projection 35. The body portion 31 is tubular at one end so as to form a female connector with which the first nose 22 of the first connector 20 can be engaged. A pair of apertures 33 (of which only one is visible) are formed in the tubular end portion of the second connector 30 to form in combination with the projections 23 a retaining mechanism for holding the first and second connectors 20 and 30 together in a coupled state.

If the first and second connectors are not in a correctly coupled condition (i.e., not correctly coupled together) they will easily separate indicating that they are not correctly secured together. However, as an additional safeguard, a spring (not shown) may be secured in the tubular end portion of the second connector 30 to ensure that if the projections 23 do not fully engage with the apertures 33 the first nose 22 is ejected from the second connector 30 thereby providing a visible indication that the first and second connectors 20 and 30 are not correctly coupled together.

The projections 23 could be a contrasting color to the color of the second connector 30 so that it would be easily apparent from a visible inspection as to whether the projections 23 are fully engaged with the apertures 33.

The first tether 26 could be connected to the first airbag 7a and the second tether 36 could be connected to the second airbag 7b or vice versa or the first tether 26 could be connected to the third airbag 7c and the second tether 36 could be connected to the second airbag 7b or vice versa or the first tether 26 could be connected to the third airbag 7c and the second tether 36 could be connected to the fourth airbag 7d or vice versa.

To assemble the airbag tether assembly 10 the first connector 20 is firstly coupled to the second connector 30 by inserting the first nose 22 into the tubular end portion of the second connector 30 until the projections 23 on the first nose portion 22 snap into engagement with the corresponding apertures 33 in the second connector 30. If the projections 23 do not engage fully with the apertures 33 then the first and second connectors 20 and 30 will not be correctly coupled together and will readily detach from one another. The assembled first and second connectors 20 and 30 are then offered up to the U-shaped bracket 11 and, if the first and second connectors 20 and 30 are correctly coupled together, the second nose portion of the first connector 20 and the nose portion 34 will readily engage between the legs 14, 15 of the U-shaped bracket 11 so as to allow the projections 25, 35 to engage with the recess 16 in a manner that they are readily released when the airbags 7a, 7b, 7c and 7d are deployed.

However, if the first and second connectors 20 and 30 are not correctly coupled together the combined thickness of the first nose 24 on the first connector 20 and the nose 34 on the second connector 30 will be greater than the distance between the two legs 14, 15 of the U-shaped bracket 11 and the first and second connectors 20 and 30 therefore cannot be readily engaged with the U-shaped bracket 11. If on the other hand only one of the first and second connectors 20 and 30 is offered up to the U-shaped bracket 11 due to the fact that the other of the first and second connectors 20 and 30 was not correctly coupled to it then the single connector 20 or 30 cannot be held in place by the U-shaped bracket 11. In either case, the inability of the assembled first and second connectors 20 and 30 to correctly mate with the mounting means in the form of the U-shaped bracket provides a clear indication that the first and second connectors 20 and 30 are not correctly coupled together.

Although the invention has been described above with reference to a construction in which a straight push snap lock fixing is used as the retaining means because this is quick to operate, simple in construction and is either engaged or disengaged, it will be appreciated that other retaining means could be used.

Figure 4A:
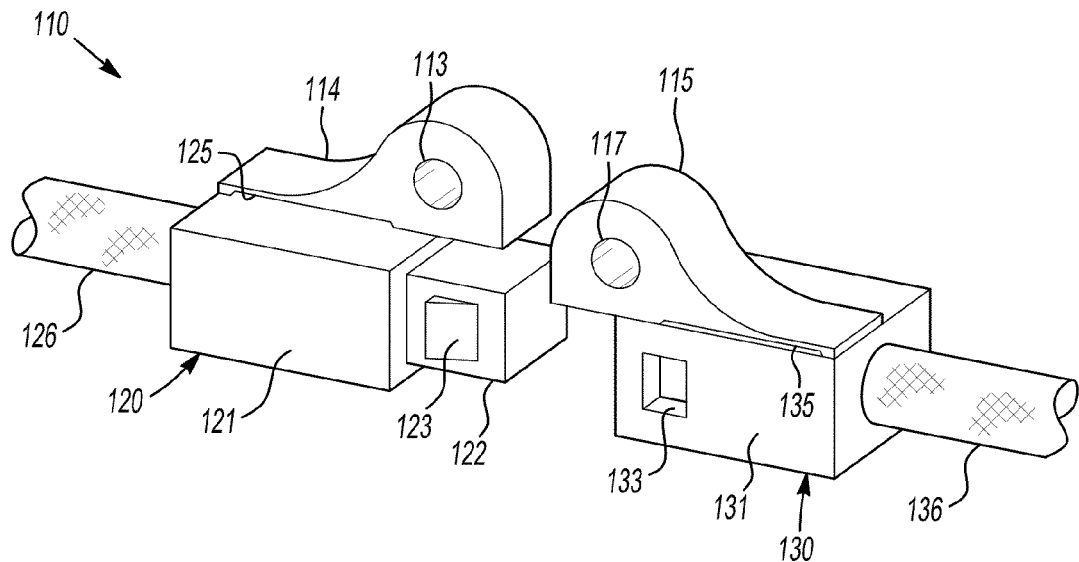
FIG. 4A is an exploded pictorial representation of a second embodiment of an airbag tether connector assembly showing the assembly in a pre-assembled state.
Figure 4B:
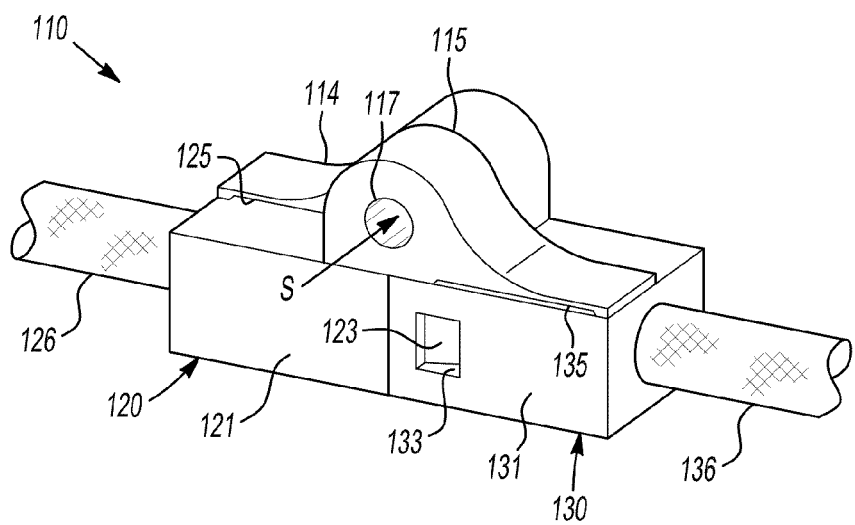
FIG. 4B is a pictorial view of the assembly of FIG. 4A in a fully assembled state prior to fixing to a vehicle.
Figure 4C:
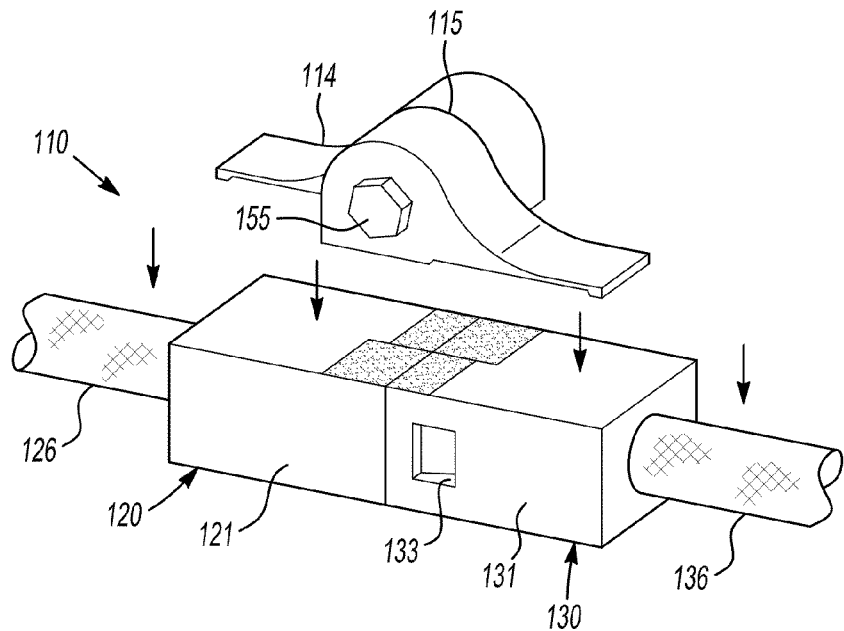
FIG. 4C is a side view of the assembly of FIG. 4B showing the assembly after deployment of the airbags has commenced.

With reference to FIGS. 4A to 4C there is shown a second embodiment of an airbag tether connector assembly. The airbag tether connector assembly 110 includes a mounting means in the form of first and second lugs 114 and 115 and a connector comprising first and second connectors 120 and 130.

The first connector 120 has a body portion 121 to which is attached a free end of a first tether 126 and a nose portion 122 forming a male connector.

A detent or projection 123 (of which only one is visible) is formed on opposite sides of the nose portion 122. The two projections 123 form part of a retaining mechanism used to hold the first and second tether connectors 120 and 130 together.

The first lug 114 is attached to the body portion 121 and is weakened at its juncture with the body by a long slit 125 so that the first connector 120 can be readily detached from the lug 114 by the force of deployment of the airbags 7a to 7d.

The first lug 114 has an aperture 113 through which a bolt 155 is passed to secure the first connector 120 to a structural part of a vehicle.

The first lug 114 can be an integral part of the body portion 121 or can be a separate part that is attached to the body portion 121 by a fixing means that can be broken when a force above a predetermined magnitude is applied.

The second connector 130 has a body portion 131 to which is attached a free end of a second tether 136 and is tubular at one end so as to form a female connector with which the nose 122 of the first connector 120 can be engaged. A pair of apertures 133 (of which only one is visible) are formed in opposite sides of the tubular end portion of the second connector 130 to form in combination with the projections 123 a retaining mechanism for holding the first and second connectors 120 and 130 together in a coupled state.

The second lug 115 is attached to the body portion 131 and is weakened at its juncture with the body by a long slit 135 so that the second connector 130 can be readily detached from the lug 115 by the force of deployment of the airbags 7a to 7d.

The second lug 115 has an aperture 117 through which a bolt 155 is passed to secure the second connector 130 to a structural part of a vehicle.

The lug 115 can be an integral part of the body portion 121 or can be a separate part that is attached to the body portion 121 by a fixing means that can be broken when a force above a predetermined magnitude is applied.

A spring (not shown) may be secured in the tubular end portion of the second connector 130 to ensure that if the projections 123 do not fully engage with the apertures 133 the nose 122 is ejected from the second connector 130 thereby providing a visible indication that the first and second connectors 120 and 130 are not correctly coupled together.

In addition, the projections 123 could be a contrasting color to the color of the first connector 120 so that it would be apparent from a visible inspection as to whether the projections 123 are fully engaged with the apertures 133. For example, the nose 122 could be colored red and the projections 123 green so that when the projections 123 are fully engaged only green would be visible through the apertures 133.

The first tether 126 could be connected to the first airbag 7a and the second tether 136 could be connected to the second airbag 7b or vice versa or the first tether 126 could be connected to the third airbag 7c and the second tether 136 could be connected to the second airbag 7b or vice versa or the first tether 126 could be connected to the third airbag 7c and the second tether 136 could be connected to the fourth airbag 7d or vice versa.

To assemble the airbag tether assembly 110 the first connector 120 is firstly coupled to the second connector 130 by inserting the nose 122 into the tubular end portion of the second connector 130 until the projections 123 on the nose portion 122 snap into engagement with the corresponding apertures 133 in the second connector 130. If the projections 123 do not engage fully with the apertures 133 then the first and second connectors 120 and 130 will not be correctly coupled together and will readily detach from one another.

In addition, if the first and second connectors members 120 and 130 are not correctly coupled together, the apertures 113 and 117 in the first and second lugs 114, 115 will not be aligned thereby preventing the bolt 155 from being inserted thereby providing a further indication that the first and second connectors 120 and 130 are not correctly coupled together.

The assembled first and second connectors 120 and 130 are then positioned in the vehicle such that they can be secured to a structural part of the vehicle using the bolt 155.

If only one of the first and second connectors 120 and 130 is offered up to be secured in place then, when an assembly tool used to tighten the bolt 155 is used, an error will be produced from the assembly tool that the mounting means, in this case the first and second lugs 114 and 115, has not been correctly secured to the vehicle.

For example, the assembly tool may automatically count the number of revolutions required to produce a predetermined torque. If more than expected revolutions are required then this will indicate to an operator that one of the lugs 114, 115 may not be present and provide an opportunity to check the integrity of the coupling between the first and second connectors 120 and 130 thereby reducing the risk of the vehicle being produced with an unconnected tether. That is to say, the failure to correctly secure the lugs 114, 115 is an indication that the coupling between the first and second connectors 120 and 130 is not correctly made.

As referred to above, when the airbags are deployed, the first and second connectors 120 and 130 readily detach from the lugs 114,115 thereby allowing the airbags secured together by the tethers 126, 136 to unfold from their stored positions.

Figure 5A:
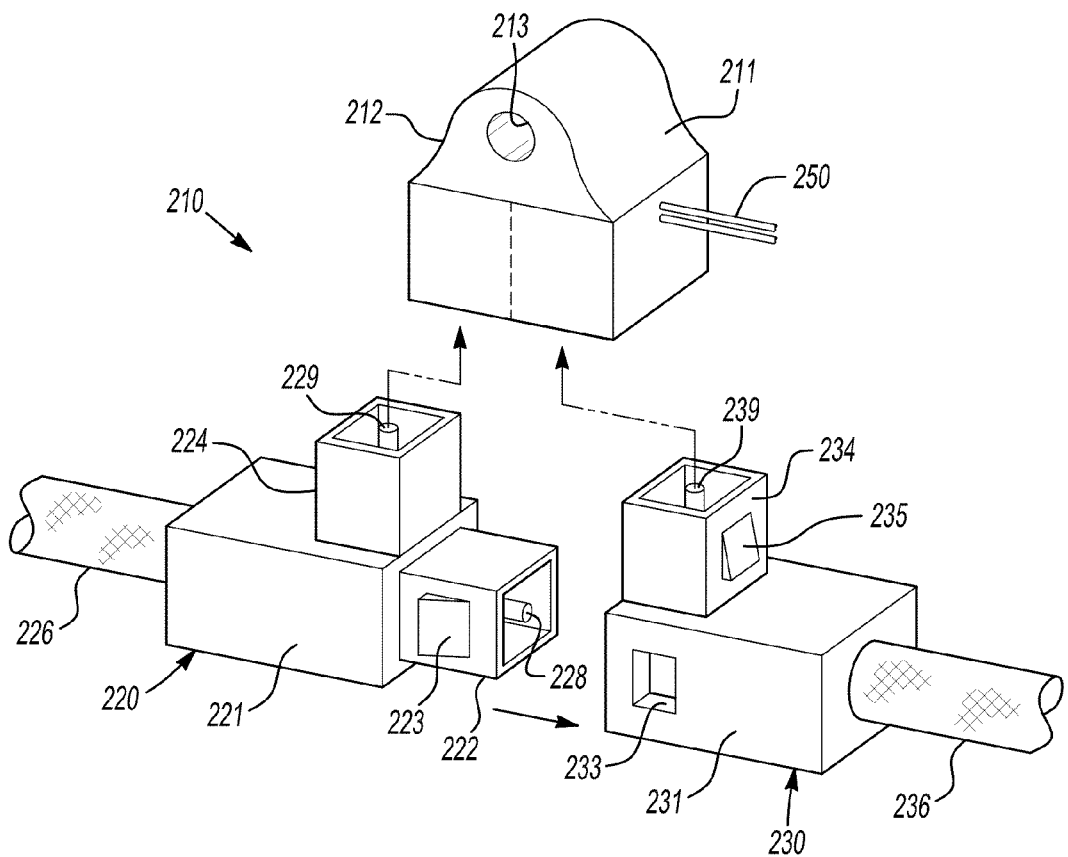
FIG. 5A is an exploded pictorial representation of a third embodiment of an airbag tether connector assembly showing the assembly in a pre-assembled state.
Figure 5B:
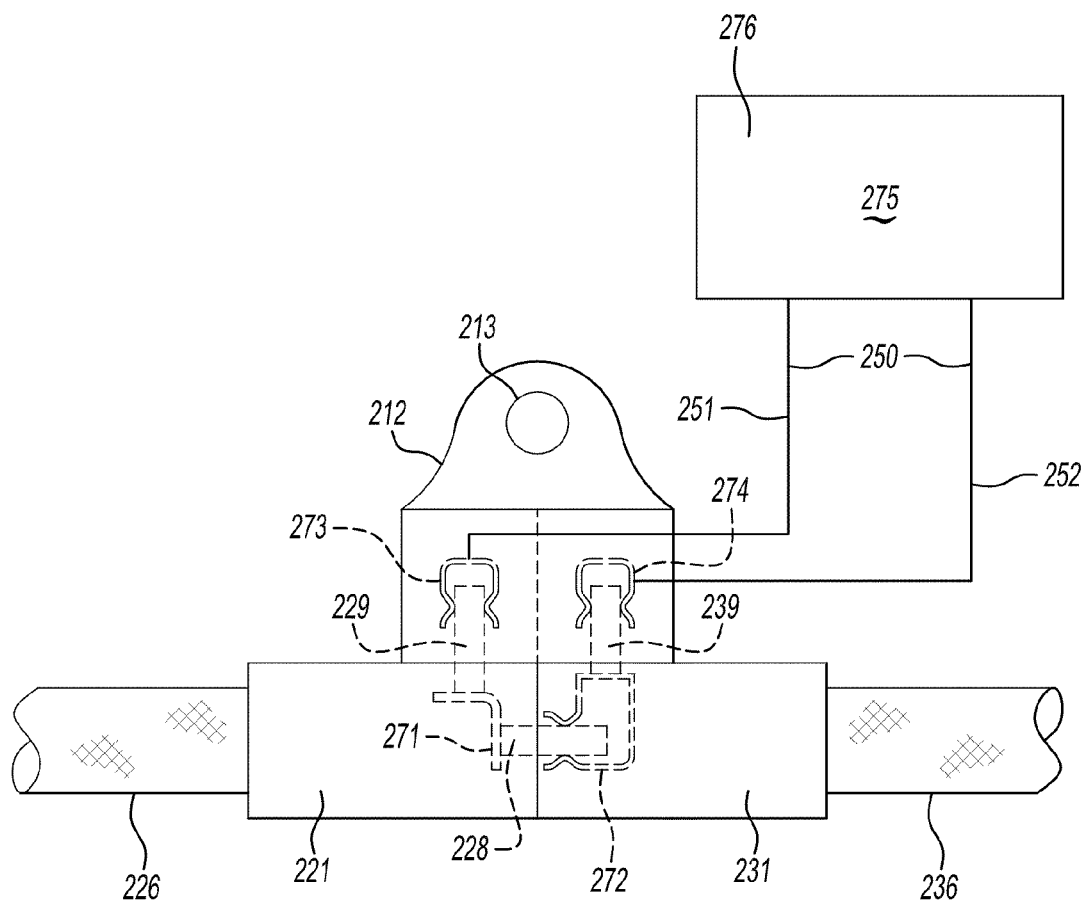
FIG. 5B is a cut-away side view of the assembly of FIG. 5A in a fully assembled state showing the airbag tether connector assembly forming part of a continuity circuit.

With reference to FIGS. 5A and 5B there is shown a third embodiment of an airbag tether connector assembly. The airbag tether connector assembly 210 includes a mounting means in the form of a hollow bracket 211 and a connector comprising of first and second connectors 220 and 230.

The bracket 211 has a body portion 212 in which is formed a rectangular cavity (not shown). The body portion 212 also has an aperture 213 therein through which a bolt (not shown) can be passed to secure the bracket 211 to a structural part of a vehicle such as for example a cant rail.

The first connector 220 has a body portion 221 to which is attached a free end of a first tether 226, a first nose portion 222 forming a first male connector and a second nose portion 224 on which is formed a projection 225 (not shown).

The first nose portion 222 is tubular and has a pair of detents or projections 223 (of which only one is visible) one formed on opposing sides of the first nose portion 222. The projections 223 form part of a retaining mechanism used to hold the first and second tether connectors 220 and 230 together.

A first electrical contact in the form of a conductive pin 228 is mounted within the tubular first nose portion 222 for cooperation with an electrical contact 272 formed in the second connector 230.

The second nose portion 224 is tubular and a second electrical contact in the form of a conductive pin 229 is mounted within the tubular second nose portion 224 for cooperation with an electrical contact 273 formed in the body portion 212. The first and second contacts 228, 229 are connected together by an electrically conductive link 271.

The second connector 230 has a body portion 231 to which is attached a free end of a second tether 236 and a tubular nose portion 234 on which is formed the projection 235. The body portion 231 is tubular at one end so as to form a female connector with which the first nose 222 of the first connector 220 can be engaged. A pair of apertures 233 (of which only one is visible) are formed in the tubular end portion of the second connector 230 to form in combination with the projections 223 a retaining mechanism for holding the first and second connectors 220 and 230 together in a coupled state.

The electrical contact 272 has one end located in the tubular end portion of the second connector 230 and a second end connected to an electrical contact 239 mounted in the tubular nose portion 234. The electrical contact 239 is mounted for engagement with an electrical contact 274 mounted in the body portion 212.

The first tether 226 could be connected to the first airbag 7a and the second tether 236 could be connected to the second airbag 7b or vice versa or the first tether 226 could be connected to the third airbag 7c and the second tether 236 could be connected to the second airbag 7b or vice versa or the first tether 226 could be connected to the third airbag 7c and the second tether 236 could be connected to the fourth airbag 7d or vice versa.

To assemble the airbag tether connector assembly 210 the first connector 220 is firstly coupled to the second connector 230 by inserting the first nose 222 into the tubular end portion of the second connector 230 until the projections 223 on the first nose portion 222 engage with the corresponding apertures 233 in the second connector 230. If the projections 223 do not engage fully with the apertures 233 then the first and second connectors 220 and 230 will not be correctly coupled together and will readily detach from one another. In addition the pin 228 will not engage with the contact 272 and so a discontinuity in electrical connection will be present.

The assembled first and second connectors 220 and 230 are then offered up to the bracket 211 and, if the first and second connectors 220 and 230 are correctly coupled together, the second nose portion 224 of the first connector 220 and the nose portion 234 of the second connector 230 will readily engage in the cavity in the bracket 211 so as to allow the projections 225, 235 on the two nose portions 224, 234 to engage with complementary recesses (not shown) formed in the cavity of the bracket 211. Note that the cavity in the body 212 of the bracket 211 is sized such that when the first and second connectors 220 and 230 are correctly engaged they will readily fit in the cavity in a manner that they are readily released when the airbags 7a, 7b, 7c and 7d are deployed.

However, if the first and second connectors 220 and 230 are not correctly coupled together the combined thickness of the second nose portion 224 on the first connector 220 and the nose 234 on the second connector 230 and the extra distance between the second nose 224 and the nose 234 will be greater than the width of the cavity in the bracket 211 and so the first and second connectors 220 and 230 cannot be readily engaged with the bracket 211.

If only one of the first and second connectors 220 and 230 is offered up to the bracket 211 due to the fact that the other of the first and second connectors 220 and 230 was not correctly coupled to it then the single connector 220 or 230 cannot be held in place by the bracket 211.

In either case, the inability of the assembled first and second connectors 220 and 230 to correctly mate with the mounting means in the form of the hollow bracket 211 provides a clear indication that the first and second connectors 220 and 230 are not correctly coupled together.

However, in the case where no attempt has been made to couple together the first and second connectors 220 and 230 or where they have been correctly coupled together but have not been releasably secured to the hollow bracket 211, an electrical continuity test can be carried out which will verify whether or not the first and second connectors 220 and 230 are correctly connected together and correctly attached to the hollow bracket 211. As can best be understood with reference to FIG. 5B, a continuity tester 275 is connected to the contacts 273, 274 supported by the hollow bracket 211 by a two wire cable 250. One wire 251 of the cable 250 connects the contact 273 to the continuity tester 275 and the other wire 252 connects the contact 274 to the continuity tester 275.

If the pin 229 is not engaged with the contact 273 or the pin 239 is not in contact with the contact 274 or the pin 228 is not in contact with the contact 272 then there will be a break in the electrical circuit which can be sensed by the continuity tester 275 and used to indicate the incorrect installation of the airbag tether connector assembly 210. A visual indication of a lack of electrical continuity can be provided by the continuity tester 275 in any convenient manner such as by illuminating a lamp 276 or sounding an audible alert. It will be appreciated that the continuity tester 275 could be connected to several airbag tether connector assemblies and that the continuity tester could be a production line tester or could be part of a diagnostics unit fitted to the vehicle so that an operator of the vehicle can be warned that the curtain airbag assembly needs to be checked.

It will be appreciated by those skilled in the art that, if the wire 251 were to be directly connected to the pin 228 and the wire 252 were to be connected directly to the contact 272, the continuity tester 275 could be used to check whether the first connector 220 is coupled to the second connector 230. That is to say, an indication would be provided if the first and second connectors are not correctly coupled together.

Figure 6:
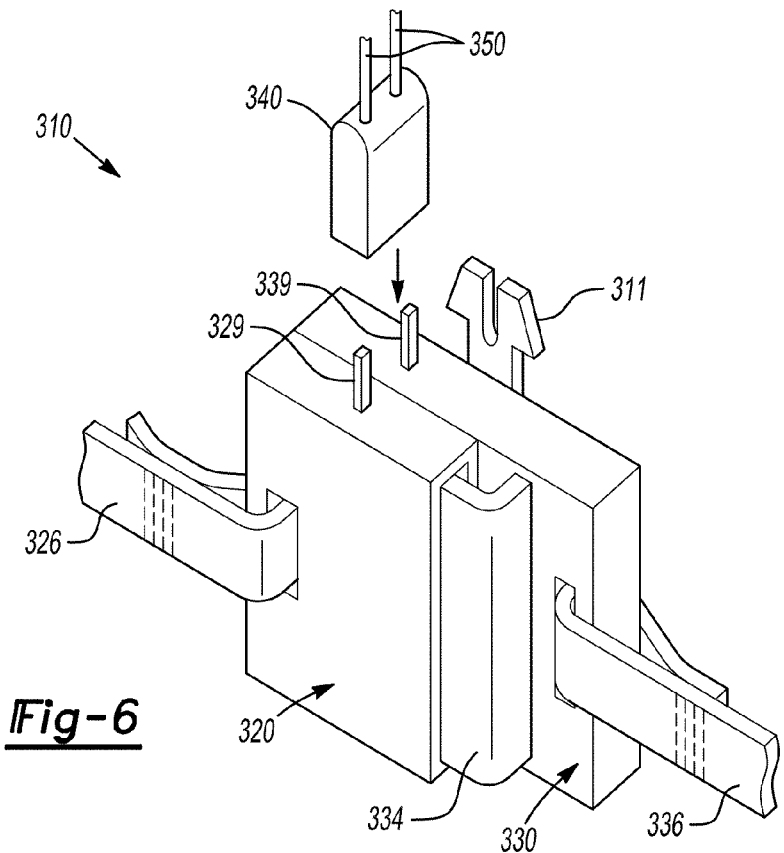
FIG. 6 is a pictorial representation of a fourth embodiment of an airbag tether connector assembly showing the assembly in an assembled state prior to fitting to a vehicle.

With reference to FIG. 6 there is shown a fourth embodiment of an airbag tether connector assembly.

The airbag tether connector assembly 310 comprises a connector having a first connector 330 to which a free end of a first tether 336 is attached and a second connector 320 to which a free end of a second tether 326 is attached and a mounting means in the form of a barbed tang 311 formed as part of the first connector 330 to permit the connector to be releasably attached to a vehicle.

The first connector 330 has an L-shaped leg 334 which has a free end engaged with an aperture in the second connector 320. The L-shaped leg has a barbed end (not shown) that snaps into engagement with recesses (not shown) formed within the aperture in the second connector 320 to form a retaining means when the first and second connectors 330 and 320 are correctly coupled together.

An electrical contact formed on the end of the L-shaped leg 334 contacts an electrical contact (not shown) within the aperture in the second connector 320 when the two connectors 320, 330 are correctly coupled together.

The electrical contact on the L-shaped leg 334 is electrically connected to a pin 339 and the contact in the second connector 320 is connected to a second pin 329.

A socket 340 is connected by a cable 350 to a continuity tester such as that shown in FIG. 5B. The socket 340 is sized for mating with the two pins 329, 339 but can only do so when the first and second connector 330 and 320 are correctly coupled together. If only one pin 329 or 339 is connected to the socket 340 or no pins 329, 339 are connected to the socket 340 then the continuity tester can use this as an indication that the first and second connector 330 and 320 are not correctly coupled together.

That is to say, an electric circuit is completed through the electrical contacts of the first and second connectors so as to provide an indication of circuit continuity only when the first connector 330 is correctly coupled to the second connector 320.

Figure 7:
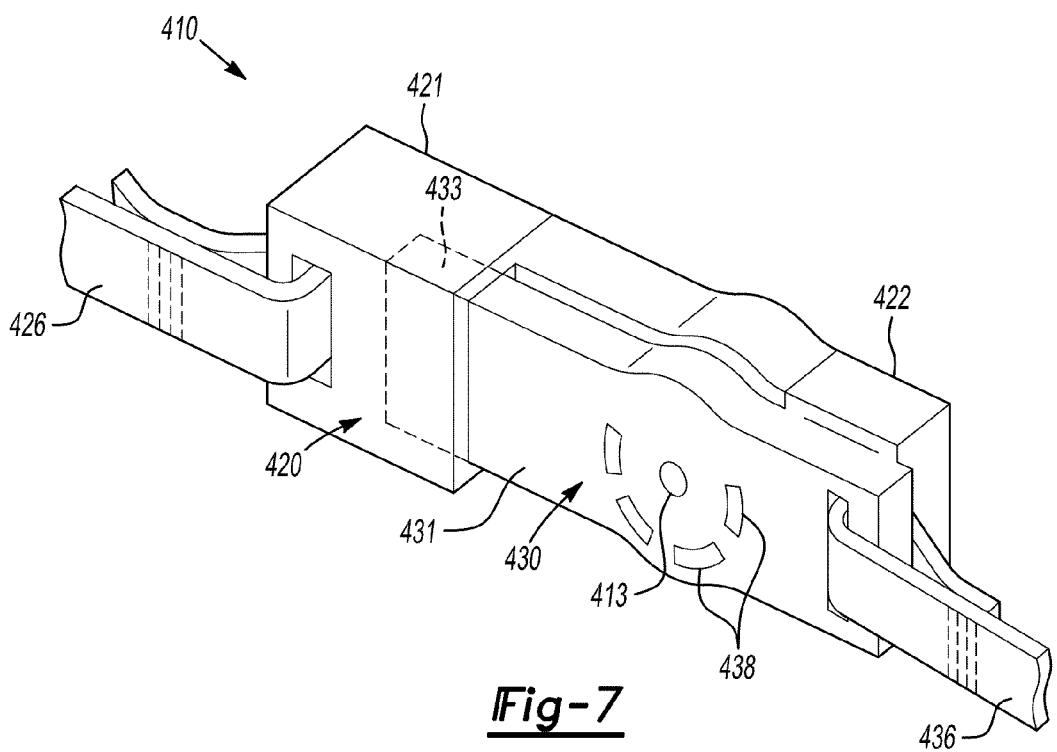
FIG. 7 is a pictorial representation of a fifth embodiment of an airbag tether connector assembly showing the assembly in an assembled state prior to fitting to a vehicle.

With reference to FIG. 7 there is shown a fifth embodiment of an airbag tether connector assembly.

The airbag tether connector assembly 410 includes a mounting means in the form of an aperture 413 and a connector comprising of first and second connectors 420 and 430.

The first connector 420 has a body portion to which is attached a free end of a first tether 426, a nose portion 422 extending from the body portion and forming a male connector, and a recess in the body portion forming a receptacle for a nose portion 433 of the second connector. A bolt-receiving hole 414 is formed through the first connector 420 and is partially surrounded by a number of weakening holes (not visible in FIG. 7) so as to allow the part of the first connector 420 containing the bolt-receiving hole 414 to detach from the rest of the first connector 420 when the airbags 7a to 7d are deployed.

The second connector 430 has a body portion 431 to which is attached a free end of a second tether 436, a nose portion 433 extending from the body portion and forming a male connector, and a recess in the body portion to form a receptacle for the nose portion 422 of the first connector 420. A bolt-receiving hole 413 is formed through the second connector 430 and is partially surrounded by a number of weakening holes 438 so as to allow the part of the second connector 430 containing the bolt-receiving hole 413 to detach from the rest of the second connector 430 when the airbags are deployed.

To assemble the airbag tether assembly the first connector 420 is firstly coupled to the second connector 430 by inserting the nose 422 into the aperture in the second connector 430 and the nose 433 into the aperture in the first connector 420 whereupon snap fit retaining means between the noses 422, 433 and the corresponding recesses are engaged when the first and second connectors 420 and 430 are correctly coupled together.

If the first and second connectors 420 and 430 will are not correctly coupled together they will readily detach from one another and, in addition, the bolt-receiving holes 413, 414 in the first and second connector 420 and 430 will not be aligned thereby preventing a bolt (not shown) from being inserted. This provides an indication that the first and second connectors 420 and 430 are not correctly coupled together.

Figure 8A:
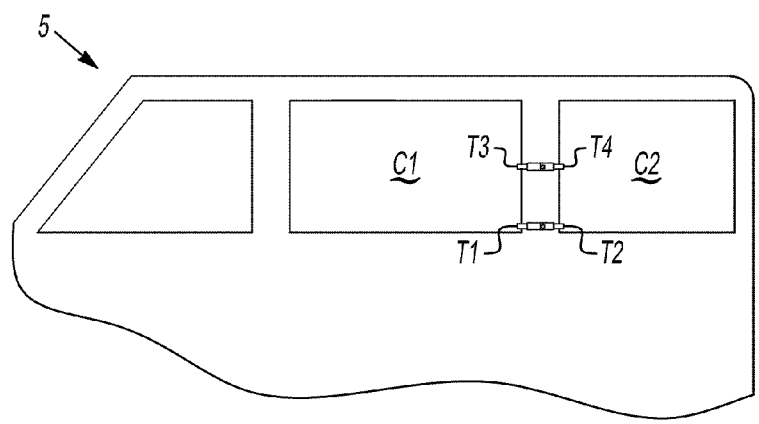
FIG. 8A is a view similar to FIG. 2 but showing a curtain airbag assembly with multiple tethers.
Figure 8B:
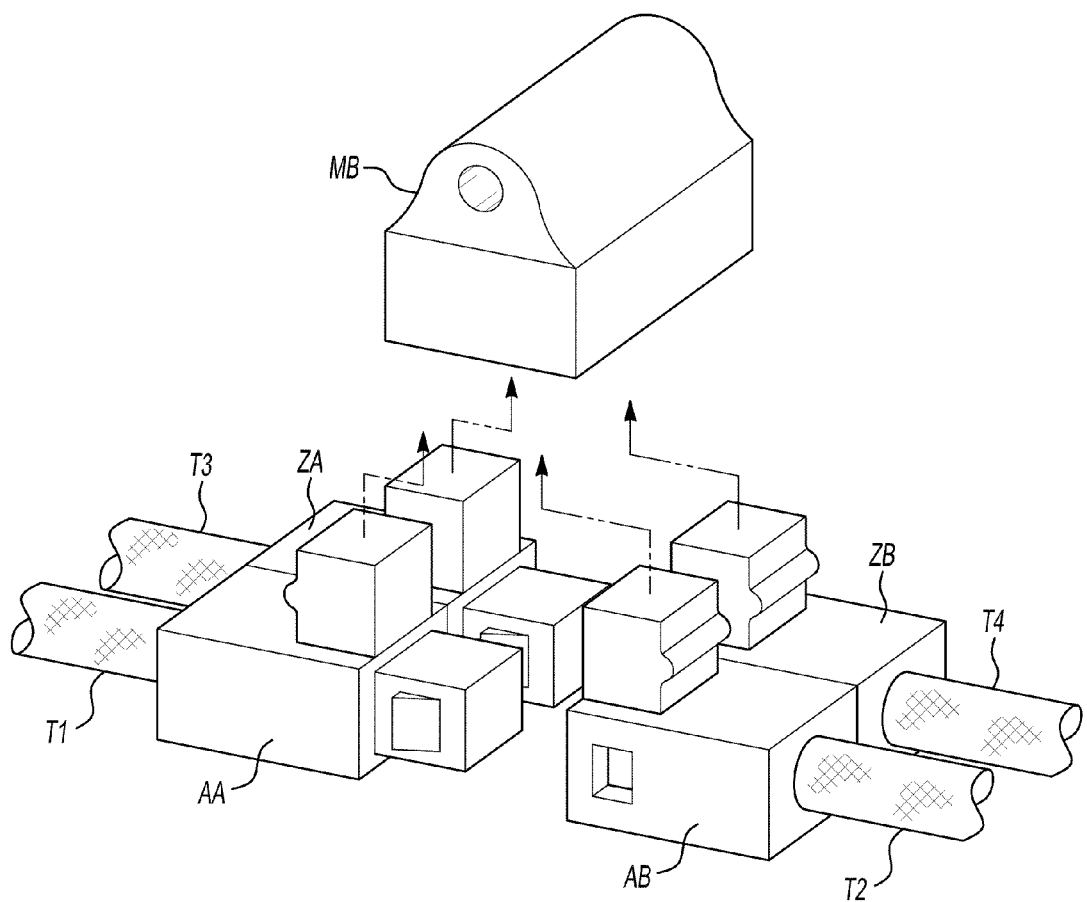
FIG. 8B is an exploded pictorial representation of a further embodiment of an airbag tether connector assembly showing the assembly in a pre-assembled state.

With reference to FIGS. 8A and 8B there is shown an airbag tether connector assembly that in many respects is the same as that shown in FIGS. 3A and 3B but is adapted to for use with more than one pair of tethers between a pair of airbags C1, C2.

A first pair of tether connectors AA, AB is provided to couple together tethers T1, T2 and a second pair of tether connectors ZA, ZB is provided to couple together tethers T3, T4.

The tether connectors AA and ZA are identical to the tether connector 20 shown in FIG. 3A and the tether connectors AB and ZB are identical to the tether connector 30 shown in FIG. 3A. The connectors AA, ZA and AB, ZB are coupled together in pairs in exactly the same manner as the connector 20 and 30 described with reference to FIGS. 3A and 3B.

The only significant difference between this embodiment and that described with reference to FIGS. 3A and 3B is that in this embodiment the mounting bracket MB is wide enough to accommodate the two pairs of tether connectors AA, AB and ZA, ZB in a side by side relationship.

As before, if the tether connectors AA, AB and ZA, ZB are not correctly coupled together they will separate indicating that they are not correctly coupled together and if they are offered to the mounting bracket MB in an incorrectly connected state they cannot be readily engaged with a cavity (not shown) in the mounting bracket MB or if only one of a pair of connectors AA, AB or ZA, ZB is engaged with the mounting bracket MB it will not be retained.

As before, the retaining means used for the connections between the respective connectors AA, AB and ZA, ZB is in the form of projections that engage with complementary apertures.

Figure 9A:
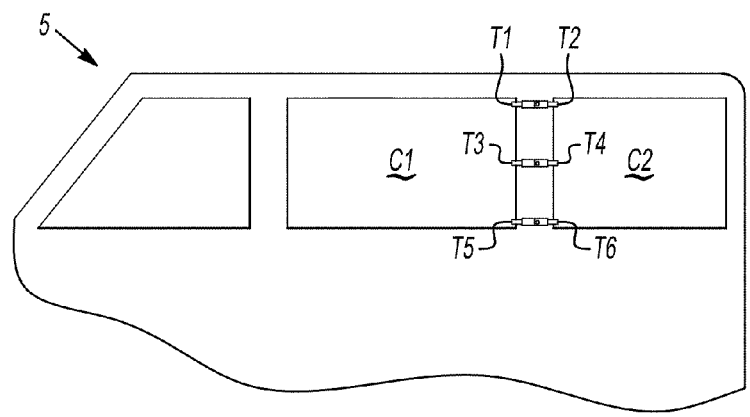
FIG. 9A is a view similar to FIG. 2 but showing a curtain airbag assembly with multiple tethers.
Figure 9B:
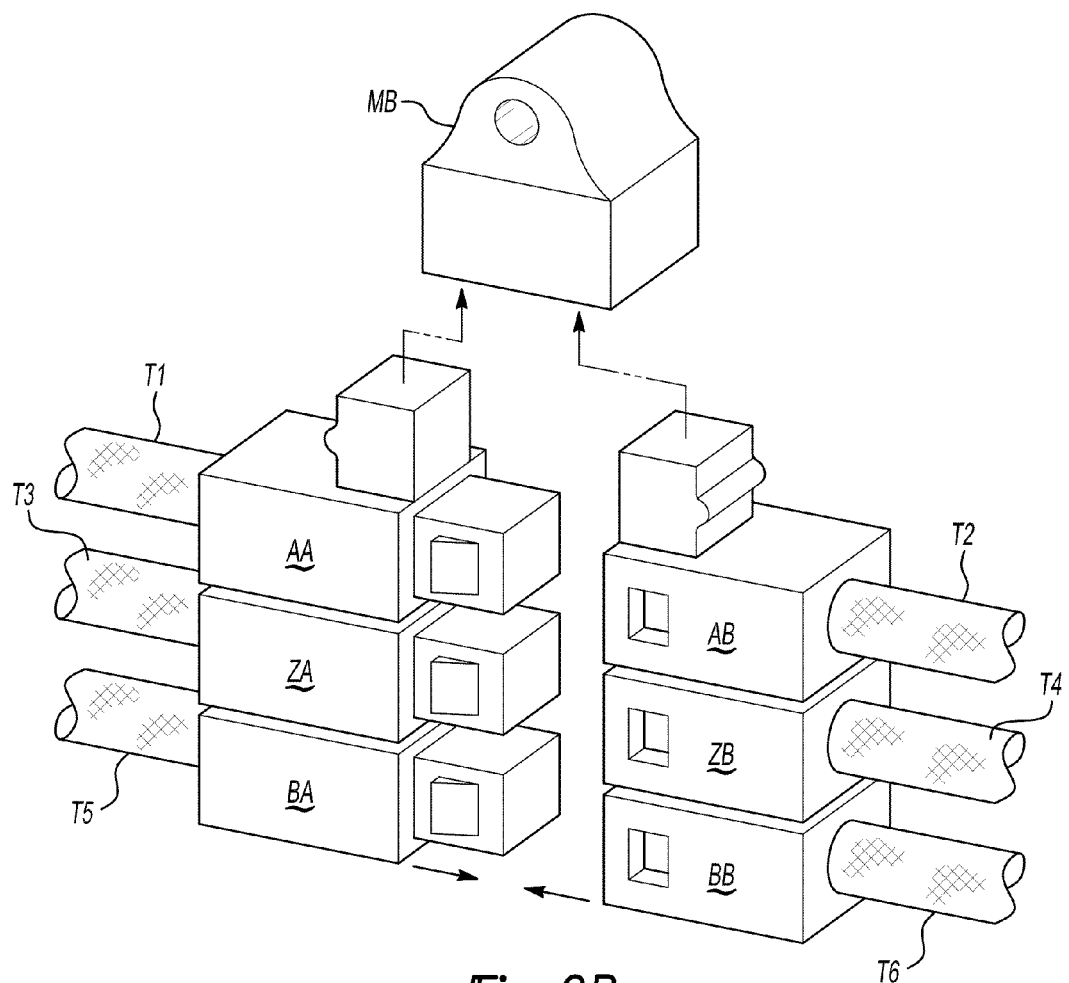
FIG. 9B is an exploded pictorial representation of a further embodiment of an airbag tether connector assembly showing the assembly in a pre-assembled state.
Figure 9C:
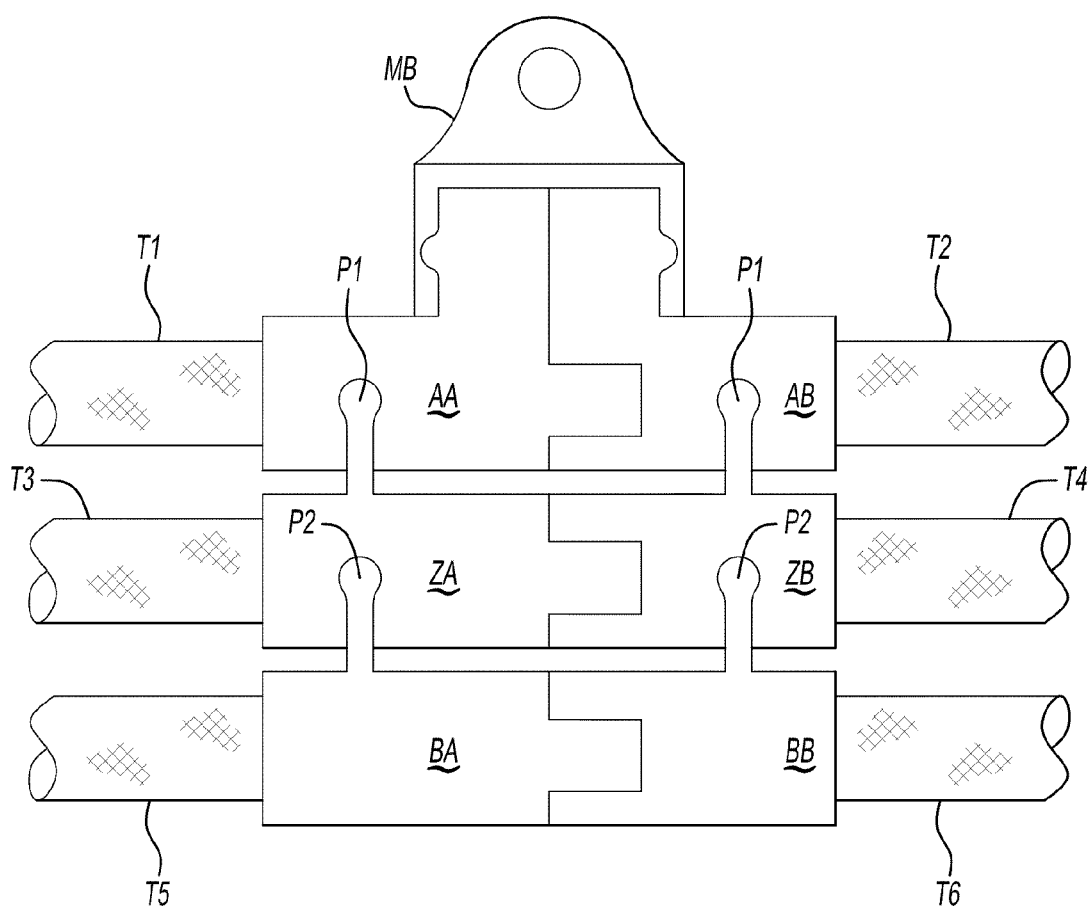
FIG. 9C is a cutaway side view of the airbag tether connector assembly of FIG. 9B showing the airbag tether connector assembly in a fully assembled state ready for fitment to a vehicle.

With reference to FIGS. 9A to 9C there is shown an airbag tether connector assembly that is in many respects the same as that shown in FIGS. 3A and 3B but is adapted to for use with more than one pair of tethers between a pair of airbags C1, C2.

A first pair of tether connectors AA, AB is provided to couple together tethers T1, T2. These tether connectors AA, AB are identical to the first and second tether members 20 and 30 shown in FIGS. 3A and 3B with the exception that each of the connectors AA, AB includes a receptacle on a lower surface for a barbed prong P1 (see FIG. 9C).

A second pair of tether connectors ZA, ZB is provided to couple together tethers T3, T4. Each of these tether connectors has a barbed prong P1 extending upwardly from an upper surface and a receptacle for a barbed prong P2 in a lower surface.

A third pair of tether connectors BA, BB is provided to couple together tethers T5, T6. Each of these tether connectors has a barbed prong P2 extending upwardly from an upper surface.

The tether connectors AA, ZA; AB, ZB and BA, BB are coupled together in exactly the same manner as the connector 20 and 30 described with reference to FIGS. 3A and 3B and, as before, the retaining means used for the connections between the respective connectors AA, AB; ZA, ZB and BA, BB is in the form of projections that engage with complementary apertures.

As before, if the tether connectors AA, AB; ZA, ZB and BA, BB are not correctly coupled together they will separate indicating that they are not correctly coupled together.

If the connectors AA, AB are not correctly coupled together then (as is the case for the embodiment shown in FIGS. 3A and 3B) they cannot be readily engaged with a cavity (not shown) in the mounting bracket MB or if only one of the pair of connectors AA, AB is engaged with the mounting bracket MB it will not be retained. Also if the connector AA, AB; ZA, ZB and BA, BB are not correctly coupled together then the barbed prongs P1, P2 on the top of the connectors ZA, ZB and BA, BB respectively cannot engage with the corresponding receptacles in the lower surfaces of the connectors AA, AB and ZA, ZB to connect the pairs of connectors AA, AB; ZA, ZB and BA, BB so that the pairs of connectors AA, AB; ZA, ZB and BA, BB are nested together in a stacked relationship. The inability or failure of one or more prongs to engage with its corresponding receptacle is an indication that one or more of the connector pairs AA, AB; ZA, ZB and BA, BB is not correctly coupled together.

It will be appreciated that an electrical circuit can be provided through the barbed prongs P1, P2 for use in checking whether the connectors BA, BB are correctly coupled together.

For example, if the barbed prongs P1, P2 are made from an electrically conductive material and contacts are provided in the receptacles for co-operation with the prongs P1, P2 then by providing an electrical link between the prongs P2 when the connectors BA, BB are correctly coupled together, providing an electrical link between the contact in connector ZA with the prong P1 of connector ZA, providing an electrical link between the contact in connector ZB with the prong P1 of connector ZB, providing an electrical link between the contact in connector AA with a continuity tester, providing an electrical link between the contact in connector AB with the continuity tester, then the existence of an electrical circuit can be determined by the continuity tester which can be used to indicate when the connectors BA, BB are not correctly coupled together.

It will be appreciated that if either of the connector pairs AA, AB or ZA, ZB are not correctly coupled together then the connector pairs AA, AB; ZA, ZB and BA, BB cannot nest correctly together and so an electrical circuit from the contact in connector AB via the electrical connections of ZB, BB, BA, ZA to the output from connector AA will not be able to be completed.

Therefore in summary the invention provides an airbag tether connector assembly for a vehicle that allows two airbag tethers to be connected together with sufficient strength to remain connected together during assembly to the vehicle, airbag deployment, exposure to loads from occupants during a side impact and when retaining occupants in the vehicle. When the curtain airbag deploys the airbag tether connector assembly permits the tether connectors to be detached from their stowed condition with minimum effort allowing the connectors and their connectors to fall easily with the inflating airbags. If tethers are not correctly coupled together this is readily detectable either during manufacture or later by incorporation as part of a driver warning system.

Although the invention is particularly suited to motor vehicles having a number of side windows such as mini-vans, mini-buses, coaches and buses it will be appreciated that it is not limited to such a use and could for examples be used in other types of vehicle such as for example a passenger aircraft or a railway carriage.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention as set out in the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An airbag tether connector assembly for a vehicle comprising:
    a first connector to which a first tether is attached and a second connector to which a second tether is attached, the first and second connectors comprising a retaining mechanism holding the two connectors coupled together and providing a visible indication that the first and second connectors are incorrectly coupled together; and
    a mounting means releasably attaching the first and second connectors to the vehicle when the first and second connectors are in engagement with one another.

2. The assembly as claimed in claim 1 wherein the retaining mechanism is a snap-lock connection.

3. The assembly as claimed in claim 1 wherein the indication is an inability of the first and second connectors to correctly mate with the mounting means.

4. The assembly as claimed in claim 3 wherein the indication is a visual indication produced by using contrasting colors for the first and second connectors.

5. The assembly as claimed in claim 1 wherein the indication is an inability of the mounting means to be secured to the vehicle.

6. The assembly as claimed in claim 1 wherein the indication is feedback from an assembly tool that the mounting means has been incorrectly secured to the vehicle.

7. The assembly as claimed in claim 1 wherein the indication is an electrical continuity signal from the connectors.

8. The assembly as claimed in claim 7 wherein the first connector includes a first electrical contact, the second connector includes a second electrical contact and an electric circuit is completed through the first and second electrical contacts so as to provide an indication of circuit continuity only when the first connector is correctly coupled to the second connector.

9. The assembly as claimed in claim 1 comprising more than one pair of first and second connectors releasably connected to the vehicle by a single mounting means.

10. The assembly as claimed in claim 1 comprising a plurality of first and second connector pairs nested together and an electrical circuit is only completed when all of the pairs of connectors are correctly coupled and correctly nested.

11. A curtain airbag assembly for a vehicle comprising:
- at least a first and a second inflatable airbag arranged in a side by side relationship with one another, each airbag being secured to a structural part of the vehicle at an upper end thereof;
- a first tether attached to the first airbag;
- a second tether attached to the second airbag;
- a first connector attached to the first tether;
- a second connector attached to the second tether, the first and second connectors comprising a retaining mechanism holding the two connectors coupled together and providing a visible indication that the first and second connectors are incorrectly coupled together; and
- a mounting means releasably attaching the first and second connectors to the vehicle when the first and second connectors are in engagement with one another.

12. The assembly as claimed in claim 11 wherein the retaining mechanism is a snap-lock connection.

13. The assembly as claimed in claim 11 wherein the indication is an inability of the first and second connectors to correctly mate with the mounting means.

14. The assembly as claimed in claim 13 wherein the indication is a visual indication produced by using contrasting colors for the first and second connectors.

15. The assembly as claimed in claim 11 wherein the indication is an inability of the mounting means to be secured to the vehicle.

16. The assembly as claimed in claim 11 wherein the indication is feedback from an assembly tool that the mounting means has been incorrectly secured to the vehicle.

17. The assembly as claimed in claim 11 wherein the indication is an electrical continuity signal from the connectors.

18. The assembly as claimed in claim 17 wherein the first connector includes a first electrical contact, the second connector includes a second electrical contact and an electric circuit is completed through the first and second electrical contacts so as to provide an indication of circuit continuity only when the first connector is correctly coupled to the second connector.

19. The curtain airbag assembly as claimed in claim 11 wherein upon deployment of the airbags the connectors are detached from the mounting means so as to permit the airbags to deploy.

20. A method for assembling a curtain airbag assembly having at least a first airbag and a second airbag within a vehicle comprising:
- providing a first tether attached to the first airbag and a second tether attached to the second airbag;
- providing a first connector attached to the first tether and a second connector attached to the second tether;
- joining the first and second connectors together in a correctly coupled condition; and
- placing the correctly coupled first and second connectors into mating engagement with a mounting means to releasably attach the first and second connectors to the vehicle, the mounting means being unable to retain the first and second connectors in said releasable attachment to the vehicle if the first and second connectors are in an incorrectly coupled condition.

* * * * *